US011946022B2

(12) United States Patent
Andriessen et al.

(10) Patent No.: US 11,946,022 B2
(45) Date of Patent: Apr. 2, 2024

(54) WATER-SOLUBLE UNIT DOSE ARTICLE COMPRISING A FIRST ALKOXYLATED ALCOHOL NON-IONIC SURFACTANT AND A SECOND ALKOXYLATED ALCOHOL NON-IONIC SURFACTANT

(71) Applicant: The Procter & Gamble Company, Cincinnati, OH (US)

(72) Inventors: Hilde Francoise Louise Andriessen, Mol (BE); Kevin Bekaert, Wemmel (BE); Jean-Pol Boutique, Gembloux (BE); Alice Michele Boutoille, Brussels (BE); Harry William Broening, Milford, OH (US); Karel Jozef Maria DePoot, Anzegem Vichte (BE); Phillip Kyle Vinson, Fairfield, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 27 days.

(21) Appl. No.: 17/469,913

(22) Filed: Sep. 9, 2021

(65) Prior Publication Data

US 2022/0073846 A1 Mar. 10, 2022

(30) Foreign Application Priority Data

Sep. 9, 2020 (EP) .................................... 20195385

(51) Int. Cl.

| | |
|---|---|
| ***C11D 17/04*** | (2006.01) |
| ***C11D 1/72*** | (2006.01) |
| ***C11D 11/00*** | (2006.01) |

(52) U.S. Cl.
CPC .............. *C11D 17/043* (2013.01); *C11D 1/72* (2013.01); *C11D 11/0017* (2013.01)

(58) Field of Classification Search
CPC ...... C11D 17/043; C11D 1/72; C11D 11/0017
See application file for complete search history.

(56) References Cited

U.S. PATENT DOCUMENTS

| | | | |
|---|---|---|---|
| 4,886,615 A | 12/1989 | Dehan | |
| 8,697,622 B2 | 4/2014 | Lentsch et al. | |
| 9,303,240 B2 | 4/2016 | Lentsch et al. | |
| 9,689,088 B2 | 6/2017 | Goodwin et al. | |
| 10,428,297 B2 * | 10/2019 | Souter | C08L 29/04 |

(Continued)

FOREIGN PATENT DOCUMENTS

| | | |
|---|---|---|
| EP | 0158464 A1 | 10/1985 |
| EP | 3279303 A1 | 2/2018 |

(Continued)

OTHER PUBLICATIONS

EP Search Report and Written Opinion for 21195700.6 dated Feb. 15, 2022, 06 pages.

(Continued)

*Primary Examiner* — Liam J Heincer
*Assistant Examiner* — M. Reza Asdjodi
(74) *Attorney, Agent, or Firm* — Andrew J. Mueller; Gregory S. Darley-Emerson

(57) ABSTRACT

A water-soluble unit dose article containing a non-soap anionic surfactant and non-ionic surfactant, where the non-ionic surfactant includes first and second alkoxylated alcohol non-ionic surfactants. A related process of laundering fabrics.

17 Claims, 1 Drawing Sheet

(56) References Cited

U.S. PATENT DOCUMENTS

| | | | | |
|---|---|---|---|---|
| 2006/0257281 | A1 | 11/2006 | Weide | |
| 2015/0329807 | A1* | 11/2015 | Naqvi | C11D 17/043 206/524.7 |
| 2017/0009191 | A1* | 1/2017 | Maes | C11D 1/825 |
| 2017/0114310 | A1* | 4/2017 | Schmiedel | D06F 35/006 |
| 2017/0211018 | A1* | 7/2017 | Dykstra | C11D 3/3773 |
| 2019/0256801 | A1 | 8/2019 | Krubasik et al. | |
| 2019/0330563 | A1 | 10/2019 | Man et al. | |
| 2020/0048588 | A1* | 2/2020 | Van Elsen | C11D 3/3723 |
| 2020/0131453 | A1 | 4/2020 | Dahlquist Howlett et al. | |
| 2020/0199503 | A1* | 6/2020 | Piorkowski | C11D 1/83 |
| 2021/0277338 | A1 | 9/2021 | Watson | |
| 2022/0073846 | A1* | 3/2022 | Andriessen | C11D 17/043 |
| 2022/0106543 | A1* | 4/2022 | Andriessen | C11D 3/43 |
| 2023/0279317 | A1* | 9/2023 | Andriessen | C11D 17/044 510/296 |

FOREIGN PATENT DOCUMENTS

| | | | | |
|---|---|---|---|---|
| EP | 3495466 | A1 * | 6/2019 | |
| EP | 3967740 | A1 * | 3/2022 | C11D 1/72 |
| JP | 2001262195 | A | 9/2001 | |
| JP | 2002294282 | A | 10/2002 | |
| WO | 02102956 | A1 | 12/2002 | |
| WO | WO-2014158662 | A1 * | 10/2014 | C11D 1/83 |
| WO | 2019107543 | A1 | 6/2019 | |

OTHER PUBLICATIONS

PCT Search Report and Written Opinion for PCT/US2021/071397 dated Nov. 26, 2021, 12 pages.

Extended EP Search Report for 20195385.8 dated Mar. 16, 2021, 7 pages.

All Office Actions; U.S. Appl. No. 18/116,356, filed on Mar. 2, 2023.

All Office Actions; U.S. Appl. No. 18/116,382, filed on Mar. 2, 2023.

All Office Actions; U.S. Appl. No. 18/116,512, filed on Mar. 2, 2023.

All Office Actions; U.S. Appl. No. 18/116,369, filed on Mar. 2, 2023.

BASF; Superior Performance With Sustainable Ingredients, Retrieved from the Internet: URL: https: //assets-global-files.com/5fc922269c5ed09aea1f7c22/60dc560c58d6335. 5794e0b08_Lutensol%2OBrochureI20122020.pdf [retrieved on Jul. 25, 2022], XP055945769, dated Jan. 12, 2020, pp. 1-32.

U.S. Appl. No. 18/116,356, filed Mar. 2, 2023, to Mate Debreczeni et al.

U.S. Appl. No. 18/116,369, filed Mar. 2, 2023, to Mate Debreczeni et al.

U.S. Appl. No. 18/116,382, filed Mar. 2, 2023, to Hilde Francoise Louise Andriessen et al.

U.S. Appl. No. 18/116,512, filed Mar. 2, 2023, to Hilde Francoise Louise Andriessen et. al.

* cited by examiner

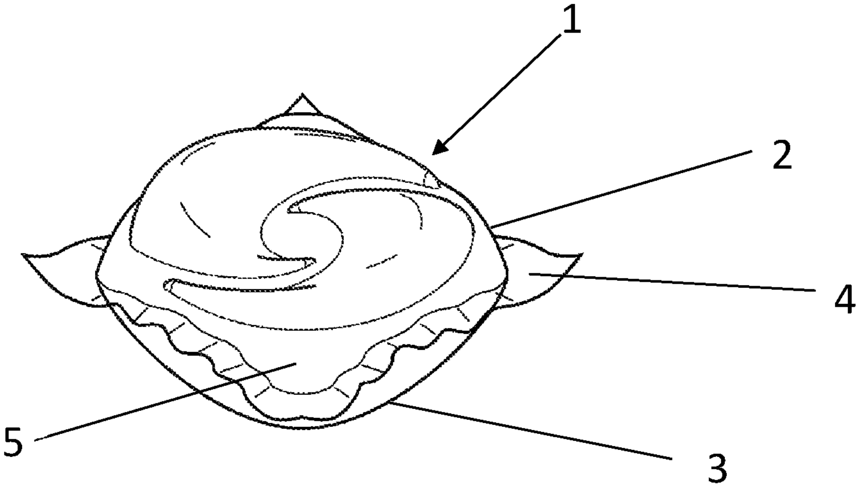
1
2
4
5
3

WATER-SOLUBLE UNIT DOSE ARTICLE COMPRISING A FIRST ALKOXYLATED ALCOHOL NON-IONIC SURFACTANT AND A SECOND ALKOXYLATED ALCOHOL NON-IONIC SURFACTANT

FIELD OF THE INVENTION

The present disclosure relates to a water-soluble unit dose article containing a non-soap anionic surfactant, a non-ionic surfactant, as well as a method of use thereof.

BACKGROUND OF THE INVENTION

Water-soluble unit dose articles are liked by consumers as they are convenient and efficient to use. Such water-soluble unit dose articles often comprise laundry detergent compositions. Without wishing to be bound by theory, when the water-soluble unit dose article is added to water, the film dissolves/disintegrates releasing the internal contents into the surrounding water to create a wash liquor.

WO2020132575 teaches a water-soluble unit dose article comprising an alkoxylated alcohol non-ionic surfactant having mixed alkoxy chains (EO/PO). It is suggested in WO2020132575 that the benefit provided by these non-ionic surfactants relates to ensuring preferred viscosity profiles in the presence of sodium laureth sulfate.

Often alkoxylated alcohol non-ionic surfactants, more particularly ethoxylated alcohol non-ionic surfactants, are formulated into the detergent compositions of water-soluble unit dose articles to provide fabric cleaning benefits. However, an issue with such materials is they can de-plasticize the film. Without wishing to be bound by theory, if the film is under plasticized, then it becomes brittle and is prone to accidental premature rupture. This issue can be rectified by reducing the alkoxylated alcohol non-ionic surfactant level, but this is often at the expense of the cleaning performance of the detergent composition.

It was surprisingly found that the careful formulation of the alkoxylated alcohol non-ionic type overcame this issue. Without wishing to be bound by theory, the combination of the first alkoxylated alcohol non-ionic surfactant according to the present invention in combination with a low level/absence of the second alkoxylated alcohol non-ionic surfactant allowed for a desired level of alkoxylated alcohol non-ionic surfactant in the detergent composition to secure cleaning performance whilst still providing desired film plasticization properties.

SUMMARY OF THE INVENTION

The present disclosure relates to a water-soluble unit dose article comprising a water-soluble film and a liquid laundry detergent composition, wherein the liquid laundry detergent composition comprises;

a. from 15% to 55% by weight of the laundry detergent composition of a non-soap anionic surfactant;
b. from 2.5% to 30% by weight of the laundry detergent composition of a non-ionic surfactant;

wherein the non-ionic surfactant comprises;

(i) a first alkoxylated alcohol non-ionic surfactant according to structure;

$$R_1\text{—O-}(AO_1)_n\text{-}(AO_2)_m\text{-}(AO_3)_z\text{—H} \quad \text{(I)}$$

wherein, $AO_1$ is a first alkoxy chain selected from an ethoxylate chain, a propoxylate chain or a butoxylate chain, $AO_2$ is a second alkoxy chain selected from an ethoxylate chain, a propoxylate chain or a butoxylate chain, $AO_3$ is a third alkoxy chain selected from an ethoxylate chain, a propoxylate chain or a butoxylate chain and wherein $AO_1$ and $AO_2$ are different from one another and wherein if $AO_3$ is present then $AO_2$ and $AO_3$ are different from one another; $R_1$ is a linear or branched alkyl chain having an average of from 8 to 18 carbon atoms; n is from 1-30, m is from 1-30 and z is from 0-30, and sum total of n+m+z is at least 10;

(ii) 2% and 10% by weight of the laundry detergent composition of a second alkoxylated alcohol non-ionic surfactant according to structure;

$$R_2\text{—O-}(EO)_p\text{—H} \quad \text{(II);}$$

wherein, EO is an ethoxylate chain; $R_2$ is a linear or branched alkyl chain having an average of from 8 to 18 carbon atoms; p is from 1-30.

The present disclosure also relates to a process of laundering fabrics comprising the steps of diluting between 200 and 1000 fold, preferably between 300 and 2000 fold the water-soluble unit dose article according to any preceding claims with water to make a wash liquor, contacting fabrics to be treated with the wash liquor.

BRIEF DESCRIPTION OF THE DRAWINGS

FIG. 1 is a water-soluble unit dose article according to the present disclosure.

DETAILED DESCRIPTION OF THE INVENTION

Water-Soluble Unit Dose Article

The present disclosure relates to a water-soluble unit dose article comprising a water-soluble film and a liquid laundry detergent composition. The water-soluble film and the liquid detergent composition are described in more detail below.

The water-soluble unit dose article comprises the water-soluble film shaped such that the unit-dose article comprises at least one internal compartment surrounded by the water-soluble film. The unit dose article may comprise a first water-soluble film and a second water-soluble film sealed to one another such to define the internal compartment. The water-soluble unit dose article is constructed such that the detergent composition does not leak out of the compartment during storage. However, upon addition of the water-soluble unit dose article to water, the water-soluble film dissolves and releases the contents of the internal compartment into the wash liquor.

The compartment should be understood as meaning a closed internal space within the unit dose article, which holds the detergent composition. During manufacture, a first water-soluble film may be shaped to comprise an open compartment into which the detergent composition is added. A second water-soluble film is then laid over the first film in such an orientation as to close the opening of the compartment. The first and second films are then sealed together along a seal region.

The unit dose article may comprise more than one compartment, even at least two compartments, or even at least three compartments, or even at least four compartments. The compartments may be arranged in superposed orientation, i.e. one positioned on top of the other. In such an orientation the unit dose article will comprise at least three films, top, one or more middle, and bottom. Alternatively, the compartments may be positioned in a side-by-side orientation, i.e. one orientated next to the other. The compartments may even be orientated in a 'tyre and rim' arrangement, i.e. a first compartment is positioned next to a second compartment, but the first compartment at least partially surrounds the second compartment but does not completely enclose the second compartment. Alternatively, one compartment may be completely enclosed within another compartment.

Wherein the unit dose article comprises at least two compartments, one of the compartments may be smaller than the other compartment. Wherein the unit dose article comprises at least three compartments, two of the compartments may be smaller than the third compartment, and preferably the smaller compartments are superposed on the larger compartment. The superposed compartments preferably are orientated side-by-side. The unit dose article may comprise at least four compartments, three of the compartments may be smaller than the fourth compartment, and preferably the smaller compartments are superposed on the larger compartment. The superposed compartments preferably are orientated side-by-side.

In a multi-compartment orientation, the detergent composition according to the present invention may be comprised in at least one of the compartments. It may for example be comprised in just one compartment, or may be comprised in two compartments, or even in three compartments, or even in four compartments.

Each compartment may comprise the same or different compositions. The different compositions could all be in the same form, or they may be in different forms.

The water-soluble unit dose article may comprise at least two internal compartments, wherein the liquid laundry detergent composition is comprised in at least one of the compartments, preferably wherein the unit dose article comprises at least three compartments, wherein the detergent composition is comprised in at least one of the compartments.

FIG. 1 discloses a water-soluble unit dose article (1) according to the present invention. The water-soluble unit dose article (1) comprises a first water-soluble film (2) and a second water-soluble film (3) which are sealed together at a seal region (4). The liquid laundry detergent composition (5) is comprised within the water-soluble soluble unit dose article (1).

Water-Soluble Film

The film of the present disclosure is soluble or dispersible in water. The water-soluble film preferably has a thickness of from 20 to 150 micron, preferably 35 to 125 micron, even more preferably 50 to 110 micron, most preferably about 76 micron.

Preferably, the film has a water-solubility of at least 50%, preferably at least 75% or even at least 95%, as measured by the method set out here after using a glass-filter with a maximum pore size of 20 microns:

5 grams±0.1 gram of film material is added in a pre-weighed 3 L beaker and 2 L±5 ml of distilled water is added. This is stirred vigorously on a magnetic stirrer, Labline model No. 1250 or equivalent and 5 cm magnetic stirrer, set at 600 rpm, for 30 minutes at 30° C. Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the percentage solubility or dispersability can be calculated.

Preferred film materials are preferably polymeric materials. The film material can, for example, be obtained by casting, blow-moulding, extrusion or blown extrusion of the polymeric material, as known in the art.

Preferred polymers, copolymers or derivatives thereof suitable for use as pouch material are selected from polyvinyl alcohols, polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum. More preferred polymers are selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and most preferably selected from polyvinyl alcohols, polyvinyl alcohol copolymers and hydroxypropyl methyl cellulose (HPMC), and combinations thereof. Preferably, the level of polymer in the pouch material, for example a PVA polymer, is at least 60%. The polymer can have any weight average molecular weight, preferably from about 1000 to 1,000,000, more preferably from about 10,000 to 300,000 yet more preferably from about 20,000 to 150,000.

Preferably, the water-soluble film comprises polyvinyl alcohol polymer or copolymer, preferably a blend of polyvinylalcohol polymers and/or polyvinylalcohol copolymers preferably selected from sulphonated and carboxylated anionic polyvinylalcohol copolymers especially carboxylated anionic polyvinylalcohol copolymers, most preferably a blend of a polyvinylalcohol homopolymer and a carboxylated anionic polyvinylalcohol copolymer.

Preferred films exhibit good dissolution in cold water, meaning unheated distilled water. Preferably such films exhibit good dissolution at temperatures of 24° C., even more preferably at 10° C. By good dissolution it is meant that the film exhibits water-solubility of at least 50%, preferably at least 75% or even at least 95%, as measured by the method set out here after using a glass-filter with a maximum pore size of 20 microns, described above.

Preferred films are those supplied by Monosol under the trade references M8630, M8900, M8779, M8310.

The film may be opaque, transparent or translucent. The film may comprise a printed area.

The area of print may be achieved using standard techniques, such as flexographic printing or inkjet printing.

The film may comprise an aversive agent, for example a bittering agent. Suitable bittering agents include, but are not limited to, naringin, sucrose octaacetate, quinine hydrochloride, denatonium benzoate, or mixtures thereof. Any suitable level of aversive agent may be used in the film. Suitable levels include, but are not limited to, 1 to 5000 ppm, or even 100 to 2500 ppm, or even 250 to 2000 rpm.

Preferably, the water-soluble film or water-soluble unit dose article or both are coated in a lubricating agent, preferably, wherein the lubricating agent is selected from talc, zinc oxide, silicas, siloxanes, zeolites, silicic acid, alumina, sodium sulphate, potassium sulphate, calcium carbonate, magnesium carbonate, sodium citrate, sodium tripolyphosphate, potassium citrate, potassium tripolyphosphate, calcium stearate, zinc stearate, magnesium stearate, starch, modified starches, clay, kaolin, gypsum, cyclodextrins or mixtures thereof.

Preferably, the water-soluble film, and each individual component thereof, independently comprises between 0 ppm and 20 ppm, preferably between 0 ppm and 15 ppm, more preferably between 0 ppm and 10 ppm, even more preferably between 0 ppm and 5 ppm, even more preferably between 0 ppm and 1 ppm, even more preferably between 0 ppb and 100 ppb, most preferably 0 ppb dioxane. Those skilled in the art will be aware of known methods and techniques to determine the dioxane level within water-soluble films and ingredients thereof.

Liquid Laundry Detergent Composition

The water-soluble unit dose article comprises a liquid laundry detergent composition. The term 'liquid laundry detergent composition' refers to any laundry detergent composition comprising a liquid capable of wetting and treating a fabric, and includes, but is not limited to, liquids, gels, pastes, dispersions and the like. The liquid composition can include solids or gases in suitably subdivided form, but the liquid composition excludes forms which are non-fluid overall, such as tablets or granules The liquid detergent composition can be used in a fabric hand wash operation or may be used in an automatic machine fabric wash operation.

The liquid laundry detergent composition comprises from 15% to 55% by weight of the laundry detergent composition of a non-soap anionic surfactant. Preferably, the detergent composition comprises between 20% and 55%, more preferably between 25% and 50% of a non-soap anionic surfactant.

Preferably, the non-soap anionic surfactant comprises linear alkylbenzene sulphonate. Preferably, the linear alkylbenzene sulphonate comprises $C_{10}$-$C_{16}$ alkyl benzene sulfonate, $C_{11}$-$C_{14}$ alkyl benzene sulphonate or a mixture thereof. Preferably, the alkylbenzene sulphonate is an amine neutralized alkylbenzene sulphonate, an alkali metal neutralized alkylbenzene sulphonate or a mixture thereof. The amine is preferably selected from monoethanolamine, triethanolamine or mixtures thereof. The alkali metal is preferably selected from sodium, potassium, magnesium or a mixture thereof. Preferably, the liquid laundry detergent composition comprises between 1% and 40%, preferably between 3% and 40%, more preferably between 6% and 35% by weight of the liquid laundry detergent composition of the linear alkylbenzene sulphonate.

Preferably, the non-soap anionic surfactant comprises an alkyl sulphate anionic surfactant wherein the alkyl sulphate anionic surfactant is selected from alkyl sulphate, an alkoxylated alkyl sulphate or a mixture thereof. The alkyl sulphate anionic surfactant may be a primary or a secondary alkyl sulphate anionic surfactant, or a mixture thereof, preferably a primary alkyl sulphate anionic surfactant. Preferably, the alkoxylated alkyl sulphate comprises ethoxylated alkyl sulphate, propoxylated alkyl sulphate, a mixed ethoxylated/propoxylated alkyl sulphate, or a mixture thereof, more preferably an ethoxylated alkyl sulphate. Preferably, the ethoxylated alkyl sulphate has an average degree of ethoxylation of between 0.1 to 5, preferably between 0.5 and 3. Preferably, the ethoxylated alkyl sulphate has an average alkyl chain length of between 8 and 18, more preferably between 10 and 16, most preferably between 12 and 15. Preferably, the alkyl chain of the alkyl sulphate anionic surfactant is linear, branched or a mixture thereof. Preferably, the branched alkyl sulphate anionic surfactant is a branched primary alkyl sulphate, a branched secondary alkyl sulphate, or a mixture thereof, preferably a branched primary alkyl sulphate, wherein the branching preferably is in the 2-position, or alternatively might be present further down the alkyl chain, or could be multi-branched with branches spread over the alkyl chain. The weight average degree of branching of alkyl sulphate anionic surfactant may be from 0% to 100% preferably from 0% to 95%, more preferably from 0% to 60%, most preferably from 0% to 20%. Alternatively, the weight average degree of branching of alkyl sulphate anionic surfactant may be from 70% to 100%, preferably from 80% to 90%. Preferably, the alkyl chain is selected from naturally derived material, synthetically derived material or mixtures thereof. Preferably, the synthetically derived material comprises oxo-synthesized material, Ziegler-synthesized material, Guerbet-synthesized material, Fischer-Tropsch—synthesized material, iso-alkyl synthesized material, or mixtures thereof, preferably oxo-synthesized material. Preferably, the liquid laundry detergent composition comprises between 1% and 35%, preferably between 3% and 30%, more preferably between 6% and 20% by weight of the liquid laundry detergent composition of the alkyl sulphate anionic surfactant.

Preferably, the non-soap anionic surfactant comprises linear alkyl benzene sulphonate and an alkoxylated alkyl sulphate, more preferably, wherein the weight ratio of linear alkylbenzene sulphonate to alkoxylated alkyl sulphate is from 1:2 to 9:1, preferably from 1:1 to 7:1, more preferably from 1:1 to 5:1, most preferably from 1:1 to 4:1.

The liquid laundry detergent composition comprises from 2.5% to 30% by weight of the liquid laundry detergent composition of a non-ionic surfactant. The non-ionic surfactant is described in more detail below.

Preferably, the weight ratio of non-soap anionic surfactant to non-ionic surfactant is from 1:1 to 13:1, preferably from 1.25:1 to 10:1, more preferably from 1.5:1 to 7.5:1.

Preferably, the liquid laundry detergent composition comprises a fatty acid, preferably a neutralized fatty acid soap, preferably a fatty acid salt, more preferably an amine neutralized fatty acid salt, wherein preferably the amine is an alkanolamine more preferably selected from monoethanolamine, diethanolamine, triethanolamine or a mixture thereof, more preferably monoethanolamine. The liquid detergent composition may comprise between 1.5% and 20%, between 2% and 15%, between 3% and 12%, or between 4% and 10% by weight of the liquid detergent composition of fatty acid.

Preferably, the liquid laundry detergent composition comprises between 1% and 20%, preferably between 5% and 15% by weight of the liquid laundry detergent composition of water.

Preferably, the liquid laundry detergent composition comprises between 10% and 40%, preferably between 15% and 30% by weight of the liquid laundry detergent composition of a non-aqueous solvent, preferably wherein the non-aqueous solvent is selected from 1,2-propanediol, dipropylene glycol, tripropyleneglycol, glycerol, sorbitol, polyethylene glycol or a mixture thereof.

Preferably, the liquid laundry detergent composition comprises an adjunct ingredient selected from the group comprising builders, perfumes, enzymes, citrate, bleach, bleach catalyst, dye, hueing dye, brightener, cleaning polymers including alkoxylated polyamines and polyethyleneimines, soil release polymer, fabric care polymers including cationic hydroxyethyl celluloses and cationic polyglucans, surfactant, solvent, dye transfer inhibitors, chelant, encapsulated perfume, polycarboxylates, structurant, pH trimming agents, anti-oxidants including Ralox 35, and mixtures thereof.

Preferably, the laundry detergent composition comprises a further enzyme selected from the group comprising hemicellulases, peroxidases, proteases, cellulases, xylanases, lipases, phospholipases, esterases, cutinases, pectinases, keratanases, reductases, oxidases, phenoloxidases, lipoxygenases, ligninases, pullulanases, tannases, pentosanases, malanases, β-glucanases, arabinosidases, hyaluronidase, chondroitinase, laccase, xyloglucanases, mannanases and amylases, nuclease or mixtures thereof, preferably a further enzyme selected from the group comprising proteases, amylase, cellulase, lipases, xyloglucanases, mannanases, and mixtures thereof. Preferably the further enzyme is a lipase.

The term lipase as used herein, includes enzymes which catalyze the hydrolysis of fats (lipids). Lipases are a sub class of esterases. Lipases suitable in the present invention include phospholipases, acyltransferases or perhydrolases e.g. acyltransferases with homology to *Candida antarctica* lipase A, acyltransferase from *Mycobacterium smegmatis*, perhydrolases from the CE 7 family, and variants of the *M. smegmatis* perhydrolase in particular the S54V variant used in the commercial product Gentle Power Bleach from Huntsman Textile Effects Pte Ltd. Suitable lipases and cutinases include those of bacterial or fungal origin. Chemically modified or protein engineered mutant enzymes are included. Examples include lipase from *Thermomyces*, e.g. from *T. lanuginosus* (previously named *Humicola lanuginosa*), cutinase from *Humicola*, e.g. *H. insolens*, lipase from strains of *Pseudomonas* (some of these now renamed to *Burkholderia*), e.g. *P. alcaligenes* or *P. pseudoalcaligenes, P. cepacia, P.* sp. strain SD705, *P. wisconsinensis*, GDSL-type *Streptomyces* lipases, cutinase from *Magnaporthe grisea*, cutinase from *Pseudomonas mendocina*, lipase from *Thermobifida fusca, Geobacillus stearothermophilus* lipase, lipase from *Bacillus subtilis*, and lipase from *Streptomyces griseus* and *S. pristinaespiralis*. Typically, the lipase enzyme is present in the composition in an amount from 0.001% to 0.03%, preferably from 0.0025% to 0.025% and more preferably from 0.005% to 0.02% by weight of the composition of enzyme active protein. Without wishing to be bound by theory, enzymes are supplied as a preparation comprising the enzyme and other ingredients. Enzymes per se are proteins that catalyse reactions. By enzyme active protein we herein mean enzyme that can actively catalyse the relevant reaction.

Preferably, the liquid laundry detergent composition has a pH between 6 and 10, more preferably between 6.5 and 8.9, most preferably between 7 and 8, wherein the pH of the laundry detergent composition is measured as a 10% product concentration in demineralized water at 20° C.

The liquid laundry detergent composition may be Newtonian or non-Newtonian. Preferably, the liquid laundry detergent composition is non-Newtonian. Without wishing to be bound by theory, a non-Newtonian liquid has properties that differ from those of a Newtonian liquid, more specifically, the viscosity of non-Newtonian liquids is dependent on shear rate, while a Newtonian liquid has a constant viscosity independent of the applied shear rate. The decreased viscosity upon shear application for non-Newtonian liquids is thought to further facilitate liquid detergent dissolution. The liquid laundry detergent composition described herein can have any suitable viscosity depending on factors such as formulated ingredients and purpose of the composition.

Non-Ionic Surfactant

The liquid laundry detergent composition comprises from 2.5% to 30% by weight of the liquid laundry detergent composition of a non-ionic surfactant. Preferably, the laundry detergent composition comprises from 3.5% to 20%, preferably from 5% to 15% by weight of the laundry detergent composition of the non-ionic surfactant.

The non-ionic surfactant comprises a first alkoxylated alcohol non-ionic surfactant according to structure;

$$R_1—O-(AO_1)_n-(AO_2)_m-(AO_3)_z—H \quad (I)$$

wherein, $AO_1$ is a first alkoxy chain selected from an ethoxylate chain, a propoxylate chain or a butoxylate chain, $AO_2$ is a second alkoxy chain selected from an ethoxylate chain, a propoxylate chain or a butoxylate chain, $AO_3$ is a third alkoxy chain selected from an ethoxylate chain, a propoxylate chain or a butoxylate chain.

$AO_1$ and $AO_2$ are different from one another.

$AO_2$ and $AO_3$ (if present) are different from one another.

$R_1$ is a linear or branched alkyl chain having an average of from 8 to 18 carbon atoms. Preferably, the alkyl chain is selected from naturally derived material, synthetically derived material or mixtures thereof. Preferably, the synthetically derived material comprises oxo-synthesized material, Ziegler-synthesized material, Guerbet-synthesized material, Fischer-Tropsch—synthesized material, iso-alkyl synthesized material, or mixtures thereof. $R_1$—O— can be derived from a primary alcohol, a secondary alcohol, or mixtures thereof, preferably a primary alcohol.

n is from 1-30, m is from 1-30 and z is from 0-30, and the sum total of n+m+z is at least 10.

Preferably, the first alkoxylated alcohol non-ionic surfactant is selected from those having the formulae (III) or (IV) or mixtures thereof, preferably having the formula (IV);

$$R_1—O-(EO)_x—(PO)_y-(AO_3)_z—H; \text{ or} \quad (III)$$

$$R_1—O—(PO)_y-(EO)_x-(AO_3)_z—H; \quad (IV)$$

wherein, EO is an ethoxylate group, PO is a propoxylate group, $AO_3$ is selected from ethoxylate group, propoxylate group or butoxylate group, preferably ethoxylate or propoxylate group.

Each x is independently from 1 to 30, preferably from 3 to 25, more preferably from 5 to 20.

Each y is independently from 1 to 30, preferably from 1 to 20, more preferably from 2 to 10.

Each z is independently from 0 to 30, preferably from 0 to 27, more preferably from 0 to 25.

Each $R_1$ is a linear or branched alkyl chain having an average of from 8 to 18, preferably from 8 to 14, more preferably from 8 to 12 carbon atoms. Preferably, the alkyl chain is selected from naturally derived material, synthetically derived material or mixtures thereof. Preferably, the synthetically derived material comprises oxo-synthesized material, Ziegler-synthesized material, Guerbet-synthesized material, Fischer-Tropsch—synthesized material, iso-alkyl synthesized material, or mixtures thereof. $R_1$—O— can be derived from a primary alcohol, a secondary alcohol, or mixtures thereof, preferably a primary alcohol.

Preferably, the sum total of x+y+z is at least 10, preferably from 10 to 50, more preferably from 10 to 40.

More preferably, the first alkoxylated alcohol non-ionic surfactant has the formula;

$$R_1—O—(PO)_y-(EO)_x—H \quad (V)$$

wherein EO is an ethoxylate group, PO is a propoxylate group.

x is from 3 to 30, preferably from 5 to 20, even more preferably from 5 to 15, most preferably from 7 to 11.

y is from 2 to 10, preferably from 3 to 9, more preferably from 4 to 8, most preferably from 5 to 7.

Preferably the sum total of x+y is from 10 to 40, preferably 10 to 30, more preferably 10 to 20.

$R_1$ is a linear or branched alkyl chain having an average of from 8 to 10 carbon atoms. Preferably, the alkyl chain is selected from naturally derived material, synthetically derived material or mixtures thereof. Preferably, the synthetically derived material comprises oxo-synthesized material, Ziegler-synthesized material, Guerbet-synthesized material, Fischer-Tropsch—synthesized material, iso-alkyl synthesized material, or mixtures thereof. Alternatively, the synthetically derived material is derived from a secondary alcohol. More preferably, $R_1$ is 2-ethylhexyl or 2-propylheptyl, most preferably 2-ethylhexyl.

The liquid laundry detergent composition may comprise between 2.5% and 20%, preferably between 2.5% and 15%, more preferably between 3% and 10% by weight of the liquid detergent composition of the first alkoxylated alcohol non-ionic surfactant.

Suitable examples of this first alkoxylated alcohol non-ionic surfactant are amongst others commercially available from BASF under the Plurafac line-up, from Dow under the Ecosurf line-up, or from Clariant under the Genapol line-up. Most preferably the first alkoxylated non-ionic surfactant comprises a guerbet derived alkyl chain such as commercially available from BASF under the Plurafac SLF line-up and from Dow under the Ecosurf EH line-up. Most preferred commercially available first alkoxylated nonionic surfactants are commercially available as Plurafac SLF180, Ecosurf EH 9 and Ecosurf EH14, especially Ecosurf EH9.

The non-ionic surfactant comprises 10% or less by weight of the laundry detergent composition of a second alkoxylated alcohol non-ionic surfactant according to structure;

$$R_2\text{—O-(EO)}_p\text{—H}; \quad \text{(II)}$$

wherein, EO is an ethoxylate chain. Preferably, the alkyl chain is selected from naturally derived material, synthetically derived material or mixtures thereof, most preferably naturally derived material. Preferably, the synthetically derived material comprises oxo-synthesized material, Ziegler-synthesized material, Guerbet-synthesized material, Fischer-Tropsch—synthesized material, iso-alkyl synthesized material, or mixtures thereof.

$R_2$ is a linear or branched alkyl chain having an average of from 8 to 18 carbon atoms, preferably a linear alkyl chain.

p is from 1-30.

More preferably, the second alkoxylated alcohol non-ionic surfactant has the formula;

$$R_2\text{—O-(EO)}_p\text{—H} \quad \text{(II)}$$

wherein, EO is an ethoxylate group.

p is an average from 5 to 12, preferably from 6 to 10, more preferably from 7 to 9, units of ethylene oxide per mole of alcohol;

$R_2$ is a linear or branched alkyl chain having an average of from 8 to 18 carbon atoms, preferably from 9 to 15 carbon atoms, more preferably from 10 to 14 carbon atoms. Preferably, the alkyl chain is selected from naturally derived material, synthetically derived material or mixtures thereof, more preferably naturally derived material. Preferably, the synthetically derived material comprises oxo-synthesized material, Ziegler-synthesized material, Guerbet-synthesized material, Fischer-Tropsch—synthesized material, iso-alkyl synthesized material, or mixtures thereof.

The liquid laundry detergent composition may comprise between 0% and 8%, preferably between 2% and 6% by weight of the detergent composition of the second alkoxylated alcohol non-ionic surfactant.

The liquid laundry detergent composition may comprise between 2% and 10%, preferably between 2% and 8%, more preferably between 2% and 6% by weight of the detergent composition of the second alkoxylated alcohol non-ionic surfactant The weight ratio of the first alkoxylated non-ionic surfactant to the second alkoxylated non-ionic surfactant is preferably from 1:1 to 7:1, preferably from 1:1 to 5:1, more preferably from 1:1 to 3:1.

The first alkoxylated non-ionic surfactant may be added straight to the liquid laundry detergent composition. Alternatively, the first alkoxylated non-ionic surfactant may first be mixed with other ingredients to create a premix. This premix comprising the first alkoxylated non-ionic surfactant may be added to the liquid laundry detergent composition. Alternatively, part of the first alkoxylated non-ionic surfactant may be added straight to the liquid laundry detergent composition, and the remainder may be added as part of a premix to the liquid laundry detergent composition. Equally, the second alkoxylated non-ionic surfactant, if present, may be added straight to the liquid detergent composition, may be added as part of a premix, or partially added straight and partially added as part of a premix.

Process of Making

Those skilled in the art will be aware of standard techniques to make the liquid laundry detergent composition and the water-soluble unit dose article according to the present invention. Those skilled in the art will also be aware of standard techniques and methods to make the ingredients of the liquid laundry detergent composition of the present invention.

Process of Use

A further aspect of the present invention is a process of laundering fabrics comprising the steps of diluting between 200 and 3000 fold, preferably between 300 and 2000 fold, the water-soluble unit dose article according to the present invention with water to make a wash liquor, contacting fabrics to be treated with the wash liquor.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

EXAMPLES

The film swelling/de-swelling upon ageing impact of addition of a mixed alkoxylated alcohol nonionic surfactant according to the invention on top of laundry detergent formulations suitable for use in water soluble unit dose articles, the laundry detergent formulations comprising different levels of ethoxylated alcohol nonionic surfactants, has been assessed using the film swelling test method described herein.

Test Method:

Film Swelling:

A film sample was prepared of a water soluble PVOH film intended to be used to form a sealed compartment enclosing the comparative compositions and liquid household detergent compositions according to the invention described herein. The film/juice ratio in the immersion is about 1:100; we typically use 5 replicates/test. The bottom of a clean inert glass recipient was covered with a thin layer of liquid and the film to be tested was spread on the liquid; air bubbles trapped under the film were gently pushed towards the sides. The remaining liquid was then gently poured on top of the film, in such a way that the film was fully immersed into the liquid. The film should remain free of wrinkles and no air bubbles should be in contact with the film. The film stayed in contact with the liquid and was stored under closed vessel conditions for 5 days at 50° C. and 1 night at 21° C. A separate glass recipient was used for each test. The film was then removed from the storage vessel, and the excess liquid was removed from the film. A piece of paper was put on the film which was laid on top of a bench paper, and then the film was wiped dry thoroughly with dry paper directly prior to weighing. The weight of the film was measured pre and post immersion testing under standard lab conditions, and the relative weight gain/loss has been calculated and expressed as a % change according to below formula;

% change=(end-weight/starting weight)*100.

Test Materials:

Table 1 summarizes the individual detergent test compositions, suitable to be formulated into water soluble unit dose articles. Comparative compositions 1 to 3 do not comprise the mixed alkoxylated alcohol nonionic surfactant according to the invention. Inventive compositions 1 and 2 comprise the mixed alkoxylated alcohol nonionic surfactants in combination with a low level of (Inventive composition 1) or absence of (Inventive composition 2) a purely ethoxylated alcohol nonionic surfactant, hence are formulations according to the invention, while Comparative Composition 4 comprises the mixed alkoxylated alcohol nonionic surfactant together with a too high level of purely ethoxylated alcohol nonionic surfactant hence is a formulation outside the scope of the invention. The film swelling impact of these different test formulations has been assessed for a PVOH based water soluble film comprising a mixed PVOH homopolymer-carboxylated PVOH copolymer blend, as provided by the MonoSol company.

TABLE 1

| Detergent formulations | | | | | | |
|---|---|---|---|---|---|---|
| 100% active | Comparative Composition 1 | Inventive Composition 1 | Comparative Composition 2 | Inventive Composition 2 | Comparative Composition 3 | Comparative Composition 4 |
| Neodol 24/7 ethoxylated alcohol nonionic surfactant | 5.0% | 5.0% | 15.0% | — | 20.0% | 20.0% |
| Mixed alkoxylated alcohol nonionic surfactant | — | 10% | — | 15% | — | 10% |
| Linear alkylbenzene sulphonic acid | 20.0% | 20.0% | 20.0% | 20.0% | 12.0% | 12.0% |
| MEA-AE3S | 15.0% | 15.0% | 15.0% | 15.0% | 8.0% | 8.0% |
| Fatty acid | 6.2% | 6.2% | 6.2% | 6.2% | 6.2% | 6.2% |
| Citric acid | 0.7% | 0.7% | 0.7% | 0.7% | 0.7% | 0.7% |
| 1,2-propanediol | 16.2% | 6.2% | 6.2% | 6.2% | 19.3% | 9.3% |
| dipropyleneglycol | 2.0% | 2.0% | 2.0% | 2.0% | 2.0% | 2.0% |
| glycerol | 5.0% | 5.0% | 5.0% | 5.0% | 5.0% | 5.0% |
| monoethanol amine | 10.9% | 10.9% | 10.9% | 10.9% | 7.4% | 7.4%% |
| Water | 8.5% | 8.5% | 8.5% | 8.5% | 8.5% | 8.5% |
| HEDP chelant | 2.4% | 2.4% | 2.4% | 2.4% | 2.4% | 2.4% |
| Ethoxylated polyethyleneimine* | 1.7% | 1.7% | 1.7% | 1.7% | 1.7% | 1.7% |
| Amphiphilic graft copolymer ** | 2.6% | 2.6% | 2.6% | 2.6% | 2.6% | 2.6% |
| Hydrogenated castor oil | 0.09% | 0.09% | 0.09% | 0.09% | 0.09% | 0.09% |
| Protease (54.5 mg/g) | 0.09% | 0.09% | 0.09% | 0.09% | 0.09% | 0.09% |

TABLE 1-continued

| Detergent formulations | | | | | | |
|---|---|---|---|---|---|---|
| 100% active | Comparative Composition 1 | Inventive Composition 1 | Comparative Composition 2 | Inventive Composition 2 | Comparative Composition 3 | Comparative Composition 4 |
| Minors (perfume, dyes, antioxidant, . . .) | Balance to 100% | Balance to 100% | Balance to 100% | Balance to 100% | Balance to 100% | Balance to 100% |
| pH (as 10% aqueous solution) | 7.4 | 7.4 | 7.4 | 7.4 | 7.4 | 7.4 |

*ethoxylated polyethyleneimine having an average degree of ethoxylation of 20 per EO chain and a polyethyleneimine backbone with MW of about 600
**polyethylene glycol graft polymer comprising a polyethylene glycol backbone (Pluriol E6000) and hydrophobic vinyl acetate side chains, comprising 40% by weight of the polymer system of a polyethylene glycol backbone polymer and 60% by weight of the polymer system of the grafted vinyl acetate side chains Test Results:

The water soluble film % weight change data summarized in table 2 show that comparative detergent compositions outside the scope of the invention not comprising a mixed alcohol alkoxylate nonionic surfactant lead to a film de-plasticization upon ageing of the water soluble film when in contact with the respective detergent compositions.

TABLE 2

| nil mixed alkoxylate alcohol formulations | |
|---|---|
| Test formulations | % weight change |
| Comparative composition 1 | −12.50% |
| Comparative composition 2 | −14.47% |
| Comparative composition 3 | −2.76% |

Table 3 shows the impact of the single variable addition of a series of mixed alkoxylated alcohols (Inventive composition 1 versus Comparative Composition 1, Comparative Composition 4 versus Comparative Composition 3) or of the full replacement of ethoxylated alcohol nonionic surfactant by mixed alkoxylated alcohol nonionic surfactant (Inventive composition 2 versus Comparative Composition 2). Single variable addition in this context means one by one replacing nonaqueous solvent (1,2-propanediol) by the mixed alkoxylated alcohol nonionic surfactant. The full ethoxylated alcohol nonionic surfactant replacement leg has been added to understand whether the observed trend is driven by the insertion of the mixed alkoxylate alcohol nonionic surfactant or by the partial removal of non-aqueous solvent (1,2-propanediol).

The weight change data summarized in table 3 below clearly show that both single variable addition of and full ethoxylated alcohol nonionic surfactant replacement by mixed alkoxylated alcohol nonionic surfactants impact film deplasticization upon ageing. Single variable addition of the mixed alkoxylated alcohol nonionic surfactant has a consistent significantly higher anticipation of the observed film deplasticization effect when co-formulated with a low level or even absence of ethoxylated alcohol nonionic surfactants, when compared to when the mixed alkoxylated alcohol nonionic surfactant is co-formulated with a high level of ethoxylated alcohol nonionic surfactants. In the case of the latter, for the particular case of Ecosurf LFE1410, even a further film de-plasticisation is observed.

TABLE 3

| Impact of mixed alkoxylated alcohol addition on film de-plasticization (delta % weight change) | | | | |
|---|---|---|---|---|
| Mixed alkoxylated alcohol nonionic surfactant | Structure*** | Inventive composition 1 (vs Comparative Composition 1) | Inventive composition 2 (vs Comparative Composition 2) | Comparative Composition 4 (vs Comparative Composition 3) |
| Plurafac SLF180 (BASF) | Mixed alkoxylated 2-propyl-1-heptanol (PO3EO12PO15) | +14.0% | +11.7% | +9.2% |
| Ecosurf EH9 (Dow) | Mixed alkoxylated 2-ethyl-1-hexanol EO9PO6) | +13.6% | +7.9% | +2.9% |
| Ecosurf LFE1410 (Dow) | Mixed alkoxylated 2-ethyl-1-hexanol (EOxPOy) | +3.6% | +6.7% | -1.9% |
| Softanol EP7025 (Nippon Shokubai) | Mixed alkoxylated C12-14 secondary alcohol (EO7PO2.5) | +10.5% | +11.8% | +4.3% |

***As defined by internal analytic analysis and supplier technical data sheets

The following are examples of multi-compartment water soluble unit dose laundry articles comprising a larger bottom compartment while having two smaller compartments in a side by side configuration superposed on top of the bottom compartment, following the Ariel 3-in-1 Pods design, as commercially available in the UK in January 2020 and as visualized in FIG. 1. The overall water soluble unit dose articles comprise exemplary formulations (Tables 2 and 3) comprising a surfactant system comprising a mixed alkoxylated alcohol nonionic surfactant according to the present invention. The below compositions are enclosed in a polyvinyl alcohol based water soluble film, more specifically a water soluble film comprising a blend of a polyvinylalcohol homopolymer and a carboxylated anionic polyvinylalcohol copolymer, as received from the MonoSol company.

TABLE 2

| Ingredients | Full article Composition (wt %) | Bottom compartment Composition (wt %) | Top compartment Composition 1 (wt %) | Top compartment Composition 2 (wt %) |
|---|---|---|---|---|
| Volume | 20.7 ml | 17.5 ml | 1.6 ml | 1.6 ml |
| Ecosurf EH9 2-ethylhexyl propoxylated-ethoxylated nonionic surfactant | 4.8 | 4.9 | 4.6 | 4.3 |
| Fatty alcohol ethoxylate non-ionic surfactant, $C_{12-14}$ average degree of ethoxylation of 7 | 3.5 | 3.7 | 3.0 | 1.9 |
| Lutensol XL100 | 0.4 | 0.5 | — | — |
| Linear $C_{11-14}$ alkylbenzene sulphonate | 24.5 | 24.9 | 23.2 | 22.3 |
| AE3S Ethoxylated alkyl sulphate with an average degree of ethoxylation of 3 | 10.2 | 10.3 | 9.8 | 9.3 |
| Citric acid | 0.6 | 0.6 | 0.6 | 0.6 |
| Palm Kernel Fatty acid | 4.7 | 4.8 | 4.5 | 4.3 |
| Nuclease enzyme* (wt % active protein) | 0.012 | 0.014 | — | — |
| Protease enzyme (wt % active protein) | 0.065 | 0.076 | — | — |
| Amylase enzyme (wt % active protein) | 0.005 | 0.007 | — | — |
| Xyloglucanese enzyme (wt % active protein) | 0.005 | — | 0.073 | — |
| Mannanase enzyme (wt % active protein) | 0.004 | 0.004 | — | — |
| Lipase enzyme (wt % active protein)** | 0.008 | — | 0.098 | — |
| Ethoxylated polyethyleneimine | 1.9 | 1.9 | 1.8 | 1.7 |
| Amphiphilic graft copolymer | 2.2 | 2.6 | — | — |
| Zwitterionic polyamine | 1.9 | 1.9 | 1.8 | 1.7 |
| Anionic polyester terephthalate*** | 0.3 | — | — | 4.4 |
| HEDP | 2.0 | 2.1 | 2.0 | 1.8 |
| Brightener 49 | 0.3 | 0.4 | 0.01 | 0.01 |
| Silicone anti-foam | 0.3 | 0.3 | — | — |
| Hueing dye**** | 0.05 | — | 0.69 | — |
| 1,2 PropaneDiol | 13.5 | 12.7 | 12.7 | 23.3 |
| Glycerine | 4.0 | 3.2 | 10.9 | 6.1 |
| Sorbitol | 0.4 | 0.06 | 4.6 | — |
| Monoethanolamine | 9.6 | 9.7 | 9.1 | 8.7 |
| K2SO3 | 0.1 | 0.1 | 0.03 | 0.4 |
| MgCl2 | 0.3 | 0.3 | 0.3 | 0.3 |
| water | 10.6 | 10.9 | 9.4 | 8.2 |
| Hydrogenated castor oil | 0.1 | 0.1 | — | 0.1 |
| Perfume | 2.7 | 3.2 | — | — |
| Aesthetic dye & Minors (incl. preservative) | Balance to 100 | Balance to 100 | Balance to 100 | Balance to 100 |
| pH (10% product concentration in demineralized water at 20° C.) | 7.4 | 7.4 | 7.4 | 7.4 |

*Nuclease enzyme is as claimed in co-pending European application 19219568.3

**added as a premix of composition: (1 wt % lipase enzyme, 33 wt % sorbitol, 21 wt % water, 45 wt % glycerin) - premix components reflected in above formula composition

***added as a premix of composition: (20 wt % anionic polyester terephthalate, 56 wt % 1,2-propanediol, 8 wt % water, 16 wt % glycerin) - premix components reflected in above formula composition

****added as a premix of composition: (12 wt % hueing dye, 71.5 wt % Pdiol, 16.5% Fatty alcohol ethoxylate non-ionic surfactant) - premix components reflected in above formula composition

TABLE 3

| Ingredients | Full article Composition (wt %) | Bottom compartment Composition (wt %) | Top compartment Composition 1 (wt %) | Top compartment Composition 2 (wt %) |
|---|---|---|---|---|
| Volume | 22 ml | 18.8 ml | 1.6 ml | 1.6 ml |
| Gram (excl film) | 23.4 g | 19.9 g | 1.8 g | 1.7 g |
| Ecosurf EH9 2-ethylhexyl propoxylated-ethoxylated nonionic surfactant | 4.0 | 3.9 | 3.1 | 5.3 |
| Fatty alcohol ethoxylate non-ionic surfactant, $C_{12-14}$ average degree of ethoxylation of 7 | 2.9 | 3.0 | 1.4 | 3.3 |
| Linear $C_{11-14}$ alkylbenzene sulphonate | 26.3 | 27.1 | 15.9 | 27.1 |
| AE3S Ethoxylated alkyl sulphate with an average degree of ethoxylation of 3 | 7.9 | 7.7 | 6.6 | 11.3 |
| Citric acid | 0.6 | 0.6 | 0.4 | 0.7 |
| Palm Kernel Fatty acid | 9.3 | 10.2 | 3.0 | 5.2 |
| Protease enzyme (wt % active protein) | 0.06 | 0.07 | — | — |
| Amylase enzyme (wt % active protein) | 0.003 | 0.004 | — | — |
| Nuclease enzyme* (wt % active protein) | 0.01 | 0.01 | — | — |
| Ethoxylated polyethyleneimine | 1.5 | 1.5 | 1.2 | 2.1 |
| Zwitterionic polyamine | 1.5 | 1.5 | 1.2 | 2.1 |
| Anionic polyester terephthalate*** | 0.3 | — | 4.4 | — |
| Cationic hydroxyethyl cellulose***** | 0.5 | — | 7.1 | — |
| HEDP | 0.8 | 0.7 | 1.3 | 2.3 |
| Brightener 49 | 0.3 | 0.3 | 0.01 | 0.02 |
| Silicone anti-foam | 0.3 | 0.3 | — | — |
| Hueing dye**** | 0.05 | — | — | 0.7 |
| 1,2 PropaneDiol | 13.0 | 11.8 | 23.1 | 17.4 |
| Glycerine | 5.7 | 5.9 | 5.3 | 3.2 |
| Sorbitol | 0.02 | 0.03 | — | — |
| PPG400 | 0.8 | — | 11.4 | — |
| Monoethanolamine | 9.3 | 9.4 | 6.2 | 10.6 |
| K2SO3 | 0.4 | 0.4 | 0.4 | 0.04 |
| MgCl2 | 0.2 | 0.1 | 0.2 | 0.3 |
| Sodium formate | 0.06 | 0.07 | — | — |
| water | 10.1 | 10.5 | 7.1 | 7.5 |
| Hydrogenated castor oil | 0.1 | 0.1 | 0.08 | 0.08 |
| Acusol 880 | 0.02 | 1 | 0.2 | — |
| Perfume | 2.7 | 3.2 | — | — |
| Ralox 35****** | 0.3 | 0.3 | — | — |
| Polyacrylate based perfume capsules | 0.4 | 0.4 | — | — |
| Aesthetic dye & Minors (incl. preservative) | Balance to 100 | Balance to 100 | Balance to 100 | Balance to 100 |
| pH (10% product concentration in demineralized water at 20° C.) | 7.4 | 7.4 | 7.4 | 7.4 |

*Nuclease enzyme is as claimed in co-pending European application 19219568.3

**added as a premix of composition: (1 wt % lipase enzyme, 33 wt % sorbitol, 21 wt % water, 45 wt % glycerin) - premix components reflected in above formula composition

***added as a premix of composition: (20 wt % anionic polyester terephthalate, 56 wt % 1,2-propanediol, 8 wt % water, 16 wt % glycerin) - premix components reflected in above formula composition

****added as a premix of composition: (12 wt % hueing dye, 71.5 wt % Pdiol, 16.5% Fatty alcohol ethoxylate non-ionic surfactant) - premix components reflected in above formula composition

*****added as a premix of composition: (37 wt % cationic hydroxyethyl cellulose, 60 wt % PPG400, 3 wt % Acusol 880)[a] - premix components reflected in above formula composition

[a]alternative premix: (37 wt % cationic hydroxyethyl cellulose, 60 wt % Ecosurf EH9, 3 wt % Acuso1880)

******added as a premix of composition: (40 wt % Ralox PA35, 60 wt % Fatty alcohol ethoxylate non-ionic surfactant e.g. C12-14EO7)[b] - premix components reflected in above formula composition

[b]alternative premix: (20 wt % Ralox PA35, 80 wt % Ecosurf EH9)

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A water-soluble unit dose article comprising a water-soluble film and a liquid laundry detergent composition, wherein the liquid laundry detergent composition comprises:

a. from about 15% to about 55% by weight of the laundry detergent composition of a non-soap anionic surfactant;

b. from about 2.5% to about 30% by weight of the laundry detergent composition of a non-ionic surfactant;

wherein the non-ionic surfactant comprises:

(i) a first alkoxylated alcohol non-ionic surfactant according to structure:

$$R_1—O-(AO_1)_n-(AO_2)_m-(AO_3)_z—H, \quad (I)$$

wherein $AO_1$ is a first alkoxy chain selected from an ethoxylate chain, a propoxylate chain or a butoxylate chain, $AO_2$ is a second alkoxy chain selected from an ethoxylate chain, a propoxylate chain or a butoxylate chain, $AO_3$ is a third alkoxy chain selected from an ethoxylate chain, a propoxylate chain or a butoxylate chain and wherein $AO_1$ and $AO_2$ are different from one another, and wherein if $AO_3$ is present, then $AO_2$ and $AO_3$ are different from one another; $R_1$ is a linear or branched alkyl chain having an average of from about 8 to about 18 carbon atoms; n is from about 1-30, m is from about 1-30 and z is from about 0-30, and sum total of n+m+z is at least about 10; and (ii) between about 2% and about 10% by weight of the laundry detergent composition of a second alkoxylated alcohol non-ionic surfactant according to structure:

$$R_2—O-(EO)_p—H, \quad (II)$$

wherein, EO is an ethoxylate chain; $R_2$ is a linear or branched alkyl chain having an average of from about 8 to about 18 carbon atoms; p is from about 1-30, and wherein the laundry detergent composition comprises between about 2.5% and about 20%, by weight of the detergent composition, of the first alkoxylated alcohol non-ionic surfactant, and between about 2% and about 8%, by weight of the detergent composition, of the second alkoxylated alcohol non-ionic surfactant, and wherein the weight ratio of the first alkoxylated non-ionic surfactant to the second alkoxylated non-ionic surfactant is from about 1:1 to about 7:1, and wherein the water-soluble film comprises a blend of a polyvinylalcohol homopolymer and a carboxylated anionic polyvinylalcohol copolymer.

2. The water-soluble unit dose article according to claim 1, wherein the laundry detergent composition comprises from about 3.5% to about 20%, by weight of the laundry detergent composition, of the non-ionic surfactant.

3. The water-soluble unit dose article according to claim 1, wherein the first alkoxylated alcohol non-ionic surfactant is selected from those having the formulae;

$$R_1—O-(EO)_x—(PO)_y-(AO_3)_z—H; \text{ or} \quad (III)$$

$$R_1—O—(PO)_y-(EO)_x-(AO_3)_z—H; \quad (IV)$$

wherein EO is an ethoxylate group, PO is a propoxylate group, $AO_3$ is selected from ethoxylate group, propoxylate group, or butoxylate group;

each x is independently from about 1 to about 30;

each y is independently from about 1 to about 30;

each z is independently from about 0 to about 30;

each $R_1$ is a linear or branched alkyl chain having an average of from about 8 to about 18 carbon atoms.

4. The water-soluble unit dose article according to claim 3, wherein the first alkoxylated alcohol non-ionic surfactant has the formula;

$$R_1—O—(PO)_y-(EO)_x—H \quad (V)$$

wherein EO is an ethoxylate group, PO is a propoxylate group;

x is from about 3 to about 30;

y is from about 2 to about 10;

$R_1$ is a linear or branched alkyl chain having an average of from about 8 to about 10 carbon atoms.

5. The water-soluble unit dose article according to claim 4 wherein $R_1$ is 2-ethylhexyl or 2-propylheptyl.

6. The water-soluble unit dose article according to claim 4 wherein the sum total of x+y is from 10 to 40.

7. The water-soluble unit dose article according to claim 1, wherein the second alkoxylated alcohol non-ionic surfactant has the formula;

$$R_2—O-(EO)_p—H, \quad (II)$$

wherein EO is an ethoxylate group;

p is an average from about 5 to about 12 units of ethylene oxide per mole of alcohol; and $R_2$ is a linear or branched alkyl chain having an average of from about 8 to about 18 carbon atoms.

8. The water-soluble unit dose article according to claim 1, wherein the detergent composition comprises between about 20% and about 55%, by weight the detergent composition, of a non-soap anionic surfactant.

9. The water-soluble unit dose article according to claim 8, wherein the non-soap anionic surfactant comprises linear alkyl benzene sulphonate and an alkoxylated alkyl sulphate.

10. The water-soluble unit dose article according to claim 9, wherein the weight ratio of linear alkylbenzene sulphonate to alkoxylated alkyl sulphate is from about 1:2 to about 9:1.

11. The water-soluble unit dose article according to claim 8, the weight ratio of non-soap anionic surfactant to non-ionic surfactant is from about 1:1 to about 13:1.

12. The water-soluble unit dose article according to claim 1 further comprising a fatty acid.

13. The water-soluble unit dose article according to claim 12, wherein the detergent composition comprises between about 1.5% and about 20%, by weight of the detergent composition, of fatty acid.

14. The water-soluble unit dose article according to claim 1, wherein the liquid laundry detergent further comprises between about 1% and about 20%, by weight of the liquid detergent composition, of water.

15. The water-soluble unit dose article according to claim 1, wherein the liquid laundry detergent composition comprises between about 10% and about 40%, by weight of the liquid laundry detergent composition, of a non-aqueous solvent, wherein the non-aqueous solvent is selected from 1,2-propanediol, dipropylene glycol, tripropyleneglycol, glycerol, sorbitol, polyethylene glycol or a mixture thereof.

16. The water-soluble unit dose article according to claim 1, wherein the water-soluble film comprises polyvinyl alcohol polymer or copolymer.

17. A process of laundering fabrics comprising the steps of diluting the water-soluble unit dose article according to claim 1 between 200- and 1000-fold with water to make a wash liquor, and contacting fabrics to be treated with the wash liquor.

* * * * *